(No Model.)
J. H. HEALEY.
BICYCLE.
No. 341,237. Patented May 4, 1886.
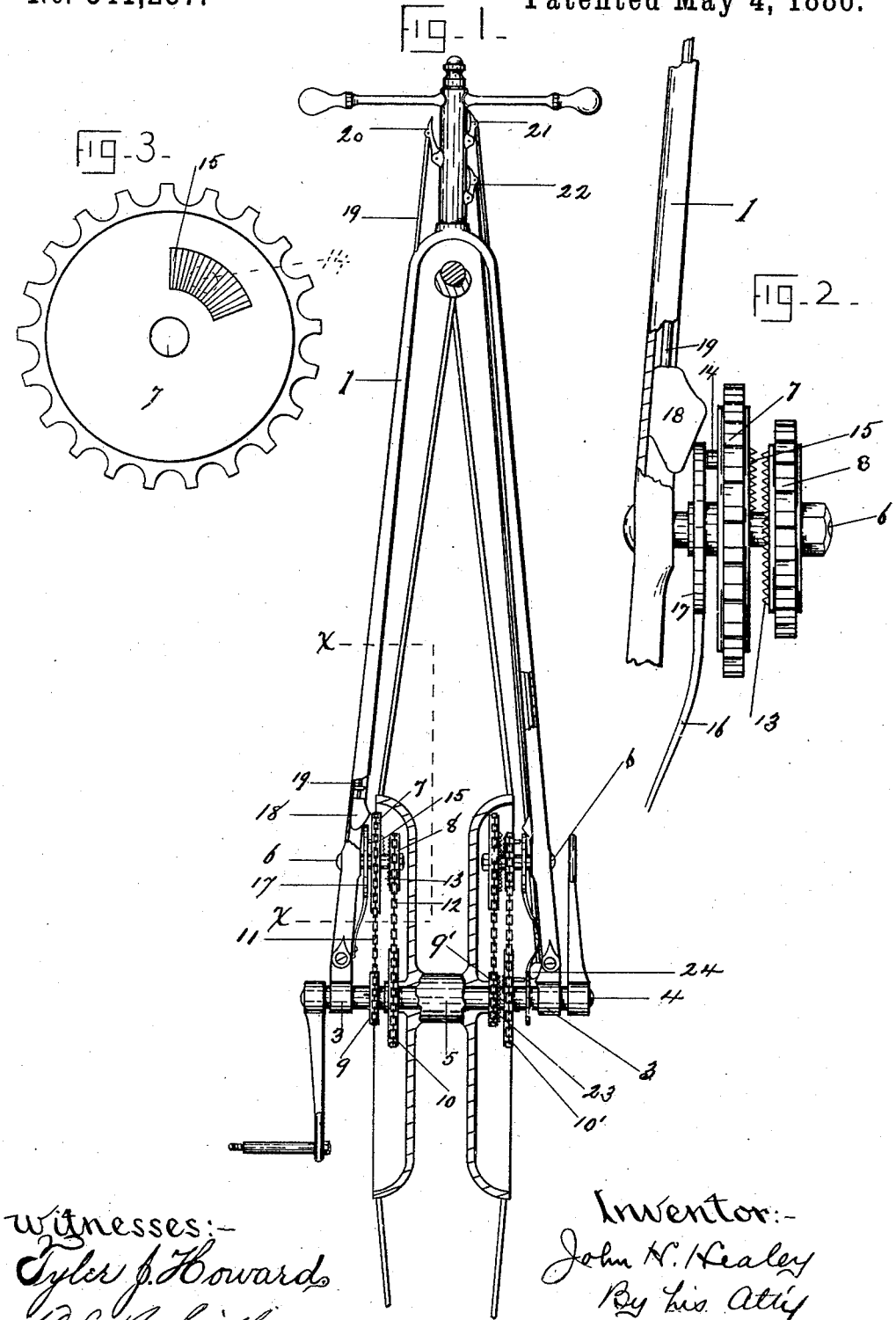
Witnesses:-
Tyler J. Howard
A. E. Beckwith
Inventor:-
John H. Healey
By his Atty
Frank H. Allen

UNITED STATES PATENT OFFICE.

JOHN H. HEALEY, OF VOLUNTOWN, CONNECTICUT.

BICYCLE.

SPECIFICATION forming part of Letters Patent No. 341,237, dated May 4, 1886.

Application filed January 11, 1886. Serial No. 188,191. (No model.)

*To all whom it may concern:*

Be it known that I, JOHN H. HEALEY, a citizen of the United States, residing at Voluntown, in the county of New London and State of Connecticut, have invented certain new and useful Improvements in Bicycles, which improvements are fully set forth and described in the following specification, reference being had to the accompanying drawings, in which—

Figure 1 is a front elevation showing my improvements properly combined. In said figure I have shown only such portions of a bicycle of ordinary construction as are necessary to explain said improvements, and have cut away the wheel-hubs to expose my newly-added mechanism. Fig. 2 shows, considerably enlarged, those parts of Fig. 1 which are embraced by line *x x*. Fig. 3 is an inner face view of the sprocket-wheel 7, and is intended to illustrate the movable part of the clutch which I make use of, as hereinafter fully described.

My improvements relate to bicycles as now commonly constructed, my immediate object being to connect with such bicycles certain combinations of mechanisms by means of which greater speed may be attained on level ground, when desired, also greater leverage may be obtained for climbing steep grades, these mechanisms being under the complete control of the rider and adapted to be used or not, as he may elect.

It has been my purpose to so shape and combine the elements which I have added that they may be attached to bicycles of the common type now in use without causing any radical changes to be made in such bicycles, the greatest change being in the shape of the hub of the driving-wheel. This hub I have so shaped that it may partially inclose and protect the several parts of my new device.

Referring to the drawings, Fig. 1 represents the so-called "fork" of a bicycle-frame, having secured to its upper portion a steering head and handles, all of the usual construction. Pivoted in the depending free ends of said fork are journal-bearings 3, in which the axial shaft 4 rotates, said shaft being provided with cranks and pedals, the latter not being shown here.

The devices by means of which I attain at will a slow or rapid motion are located one on each side of the hub 5 of the driving-wheel, and as such devices are substantially alike I will describe but one in detail.

Secured fixedly in fork I, above the journal-bearing 3, is a stud, 6, on which are rotatably located two sprocket-wheels, 7 and 8, of different diameters. Immediately below wheels 7 and 8 are similar sprocket-wheels, 9 10, connected with those first referred to by endless chains 11 12.

Referring to the mechanism at the left-hand side of Fig. 1, wheel 9 is secured by spline or set-screw to axle 4, and wheel 10 is secured to the hub 5, which is loosely fitted on said axle.

Wheel 9 is small and corresponds in size with the inner wheel, 8, on stud 6.

The hub-wheel 10 is preferably of the same diameter as the wheel 7.

Assuming that the chains 11 12 are properly connected, as shown, it will now be understood that if the upper sprocket-wheels, 7 8, be connected to each other rotary movement of axle 4 will impart a very much slower movement to the hub 5 and its wheel than if said hub were connected directly with said axle and simply operated by the cranks, as heretofore. This system of chains and sprocket-wheels necessitates a quicker movement of the feet to keep up the speed, but also materially reduces the weight of pressure that must be exerted by the rider in ascending steep grades, the quick motion of the feet and legs being unobjectionable, for the reason that it is kept up but a few minutes at a time.

To provide a simple but strong clutch by which to connect the upper sprocket-wheels, when desired, I have formed the confronting side of wheel 8 with radial V-shaped grooves 13, and have located in wheel 7 a stud, 14, oval or angular in cross-section, to prevent its rotating, and on the end which confronts the grooves 13 have formed a segmental head, 15, having radial ribs adapted to interlock with said grooves to cause wheels 7 and 8 to rotate together.

It will now be evident that a means must be provided whereby the clutch described may be thrown in and out of engagement by the rider. This I accomplish by securing to the inner side of fork I a spring, 16, whose free end carries a plate or washer, 17, located adjacent to the outer face of wheel 7, as shown, the spring acting ordinarily to hold the plate away from said wheel. This plate is forced inward, preferably by a wedge, 18, attached to rod 19, reaching upward to the head of the machine, being connected there with a lever, 20, secured to said head and adapted to be moved downward to actuate the wedge 18. Rod 19 passes downward within the arm of the fork, being thus protected from injury, and also concealed from view. The opposite system (of sprocket wheels and chains) is the same in principle as that just described, and is operated in the same manner; but the positions of the large and small wheels relative to the other mechanism is transposed, so that the lower large wheel is fast on the axle 4 and the small wheel secured to the hub 5. By this arrangement rotary motion imparted to axle 4 is increased in hub 5 according to the relative diameters of the sprocket-wheels forming the train. The normal or medium of speed is attained by connecting wheels 9' and 10', which is done by means of a clutch, 23, and operating wedge or cam 24, indentical with those above described; but it should be understood that when so used both of the upper clutches are thrown out of engagement. Thus it will be seen that the rider has under his immediate control three lever-handles, as follows: 20, for operating the power mechanism for use on steep grades; 21, for speed on level ground, and 22, for the medium or normal speed.

When it becomes necessary to ascend a steep grade, lever 22 is raised to disengage wheels 9 and 10, and lever 20 is forced downward to operate the connecting-clutch of wheels 7 and 8. After having passed the upgrade levers 22 and 20 may be respectively opened and closed to return to the medium of leverage. When unusually great speed is desired, lever 22 is raised and lever 21 forced downward, thus throwing into working engagement the speed-multiplying train, as shown at the right-hand side of Fig. 1. When moving rapidly downgrade, all three of the clutches may be thrown out of engagement, in which case the cranks and axle are at rest until one of the clutches is again brought into use.

The cost of making and applying my improvements is small when compared with the great range of speed and power thereby secured.

Having thus described my invention, I claim—

1. In combination with the fork, axle, and hub of a bicycle, mechanism for increasing the speed, consisting of a train of sprocket wheels and chains arranged and connected as described, and clutch mechanism, substantially as described, for operating the same, mechanism for decreasing the speed, consisting of a train of sprocket wheels and chains arranged and connected as described, and clutch mechanism, substantially as described, for operating the same, and independent clutch mechanism, substantially as shown and described, by means of which the crank-axle and hub may be connected at will to produce an intermediate or normal speed.

2. In combination with the fork and axle of a bicycle, a hub rotatably fixed on said axle, a disk securely fixed to said hub, as described, a clutch-disk of the form described, rotatably located on said axle adjacent to said hub-disk, and clutch mechanism, substantially as herein described, for connecting and disconnecting said hub-disk and clutch-disk, for the object specified.

JOHN H. HEALEY.

Witnesses:
 FRANK H. ALLEN,
 TYLER J. HOWARD.